(12) United States Patent
Taveniku et al.

(10) Patent No.: US 11,881,613 B2
(45) Date of Patent: Jan. 23, 2024

(54) TRANSPARENT PACKAGE FOR WINDOW MOUNTED TRANSCEIVER UNIT

(71) Applicant: CORNING INCORPORATED, Corning, NY (US)

(72) Inventors: Mikael Bror Taveniku, Painted Post, NY (US); Mark Peter Taylor, Montour Falls, NY (US)

(73) Assignee: CORNING INCORPORATED, Corning, NY (US)

( * ) Notice: Subject to any disclaimer, the term of this patent is extended or adjusted under 35 U.S.C. 154(b) by 272 days.

(21) Appl. No.: 17/609,185

(22) PCT Filed: May 8, 2020

(86) PCT No.: PCT/US2020/031977
§ 371 (c)(1),
(2) Date: Nov. 5, 2021

(87) PCT Pub. No.: WO2020/231763
PCT Pub. Date: Nov. 19, 2020

(65) Prior Publication Data
US 2022/0231401 A1   Jul. 21, 2022

Related U.S. Application Data

(60) Provisional application No. 62/846,135, filed on May 10, 2019.

(51) Int. Cl.
*H01Q 1/00* (2006.01)
*H01Q 1/12* (2006.01)
(Continued)

(52) U.S. Cl.
CPC ......... *H01Q 1/1271* (2013.01); *H01Q 1/2283* (2013.01); *H01Q 5/35* (2015.01);
(Continued)

(58) Field of Classification Search
CPC ...... H01Q 1/1271; H01Q 5/35; H01Q 1/2283; H01Q 21/065; H01Q 1/38; H01Q 1/24
See application file for complete search history.

(56) References Cited

U.S. PATENT DOCUMENTS

| 5,872,542 A | 2/1999 | Simons et al. |
| 6,166,698 A | 12/2000 | Turnbull et al. |

(Continued)

FOREIGN PATENT DOCUMENTS

| KR | 10-0964280 B1 | 6/2010 |
| KR | 10-1488743 B1 | 2/2015 |

(Continued)

OTHER PUBLICATIONS

European Patent Application No. 20804855 Supplementary European Search Report and Search Opinion dated Nov. 22, 2022; 11 Pages; European Patent Office.

(Continued)

*Primary Examiner* — Joseph J Lauture (57) ABSTRACT

Embodiments of the disclosure relate to an antenna unit. The antenna unit includes a first antenna plate and a second antenna plate. The second antenna plate is spatially disposed from the first antenna plate. A glass frame is disposed between the antenna plates, defining an internal cavity. The antenna unit also includes a printed circuit board (PCB), a first and second integrated circuits (IC) mounted to the at least one PCB. The first IC is configured to send/receive signals at a first frequency. The second IC is configured to send/receive signals at a second frequency different from the first frequency. The antenna unit also includes a waveguide elements configured to transmit signals at the first and second frequencies through respective first and second waveguide channels. The antenna plates, the glass frame, (Continued)

and PCB comprise a material that transmits at least 50% of incident light in the visible spectrum.

20 Claims, 7 Drawing Sheets

(51) Int. Cl.
  *H01Q 5/35* (2015.01)
  *H01Q 1/22* (2006.01)
  *H01Q 21/06* (2006.01)
  *H01Q 1/38* (2006.01)
  *H01Q 1/24* (2006.01)
(52) U.S. Cl.
  CPC ............. *H01Q 21/065* (2013.01); *H01Q 1/24* (2013.01); *H01Q 1/38* (2013.01)

(56) References Cited

U.S. PATENT DOCUMENTS

| | | | |
|---|---|---|---|
| 8,719,877 B2 | 5/2014 | Vondoenhoff et al. | |
| 8,975,864 B2 | 3/2015 | Kim | |
| 9,081,246 B2 | 7/2015 | Rozbicki | |
| 9,278,886 B2 | 3/2016 | Boek et al. | |
| 9,321,680 B2 | 4/2016 | Chuang et al. | |
| 9,357,111 B2 | 5/2016 | White et al. | |
| 9,656,909 B2 | 5/2017 | Burket et al. | |
| 10,011,525 B2 | 7/2018 | Logunov et al. | |
| 10,014,948 B2 | 7/2018 | Ashrafi | |
| 10,131,466 B2 | 11/2018 | Rosenblatt | |
| 2005/0151698 A1 | 7/2005 | Mohamadi | |
| 2009/0047900 A1 | 2/2009 | Cruz et al. | |
| 2018/0090992 A1 | 3/2018 | Shrivastava et al. | |
| 2018/0115071 A1 | 4/2018 | Noori et al. | |
| 2018/0123692 A1 | 5/2018 | Leiba | |
| 2018/0139521 A1 | 5/2018 | Cumana Morales et al. | |
| 2023/0043157 A1* | 2/2023 | Zeine ..................... H02J 50/80 | |

FOREIGN PATENT DOCUMENTS

| | | |
|---|---|---|
| KR | 10-2016-0075255 A | 6/2016 |
| KR | 10-1810309 B1 | 12/2017 |
| WO | 2019/056581 A1 | 3/2019 |

OTHER PUBLICATIONS

International Search Report and Written Opinion of the International Searching Authority; PCT/US20/31977; dated Aug. 14, 2020; 15 Pages; Korean Intellectual Property Office.

Lien, J., et al, "Soli: Ubiquitous Gesture Sensing with Millimeter Wave Radar", ACM Trans. Graph., vol. 35, No. 4, Article 142, Jul. 2016, 19 pages.

Wahab, Mashury, "Radar radome and its design considerations", IEEE Xplore Dec. 2009.

* cited by examiner

TRANSPARENT PACKAGE FOR WINDOW MOUNTED TRANSCEIVER UNIT

CROSS-REFERENCE TO RELATED APPLICATIONS

This application claims the benefit of priority under 35 U.S.C. § 371 of International Application No. PCT/US2020/031977, filed on May 8, 2020, which priority under 35 U.S.C. § 119 of U.S. Provisional Application No. 62/846,135 filed May 10, 2019, the content of each of which is incorporated herein by reference in its entirety.

BACKGROUND

The disclosure relates generally to a transceiver unit and, in particular, to a substantially transparent transceiver unit. Deployment of the 5G network has required the installation of many new antennas. Such antennas are often mounted to buildings, and installation of the antennas typically requires running power cables through windows or walls of the building. Additionally, the antennas themselves and/or their mounting equipment obscure aesthetic architectural features or views through windows once installed.

SUMMARY

In one aspect, embodiments of the disclosure relate to an antenna unit. The antenna unit includes a first antenna plate having a first interior surface and a first exterior surface and a second antenna plate having a second interior surface and a second exterior surface. The second antenna plate is spatially disposed from the first antenna plate and the second interior surface of the second antenna plate faces the first interior surface of the first antenna plate. A glass frame is disposed between the first interior surface of the first antenna plate and the second interior surface of the second antenna plate. The glass frame defines an internal cavity. The antenna unit also includes at least one printed circuit board (PCB), a first integrated circuit (IC) mounted to the at least one PCB, and a second IC mounted to the at least one PCB. The first IC is configured to at least one of send or receive signals at a first frequency. The second IC is configured to at least one of send or receive signals at a second frequency. The second frequency is different from the first frequency. The antenna unit also includes a first wave guide element configured to transmit signals at the first frequency through first waveguide channels between the first antenna plate and the first IC and a second wave guide element configured to transmit signals at the second frequency through second waveguide channels between the second antenna plate and the second IC. The first antenna plate, the second antenna plate, the glass frame, and each of the at least one PCB comprises a material that transmits at least 50% of incident light in the visible spectrum.

In another aspect, embodiments of the disclosure relate to a method in which an antenna unit is mounted to an exterior surface of a window. The antenna unit includes at least one transparent antenna plate, at least one transparent waveguide element, at least one transparent printed circuit board (PCB), and at least one integrated circuit (IC). The at least one IC is mounted to the at least one PCB, and the at least one transparent waveguide element transmits signals between the at least one antenna plate and the at least one IC. A power unit is provided on an interior side of the window, and electrical power is wirelessly transmitted through the window to the antenna unit.

In still another aspect, embodiments of the disclosure relate to a transceiver unit that includes a power unit configured to wirelessly transmit power through a window and an antenna unit configured to receive power through the window from the power unit. The antenna unit includes at least one antenna plate, at least one printed circuit board (PCB), at least one integrated circuit (IC) mounted to the at least one PCB, and at least one waveguide element configured to transmit signals between the at least one antenna plate and the at least one IC. Each of the at least one antenna plate, the at least one waveguide element, and the at least one PCB comprises a material that transmits at least 50% of incident light in the visible spectrum.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and the operation of the various embodiments. In the drawings.

DETAILED DESCRIPTION

Embodiments of the present disclosure relate to a transparent transceiver unit. The transceiver unit is constructed primarily of transparent materials such that the transceiver unit can be mounted in a non-obstructive manner. The current buildout of 5G infrastructure involves the dense installation of antennas to direct signals between various points in the network. In many instances, the antennas are mounted to buildings, and the antennas require installation of power or data transmission cables through windows and/or walls of the building. In particular, the antennas need power to operate, and the millimeter waves associated with 5G signals do not penetrate windows and walls very well, requiring a line to transmit the signal into the building. According to the present disclosure, however, the transceiver unit has an antenna unit mounted to the exterior surface of a window that receives 5G signals and transmits them through the window at a lower frequency signal, such as typical Wi-Fi frequency, that is better able to transmit through the building window and walls. Additionally, in embodiments, the antenna unit is wirelessly powered, such as through an inductively coupled power unit mounted to the opposite, interior side of the window. In this way, no significant alterations have to be made to the building to install the transceiver unit, and the optional use of transparent materials allows for the antenna unit to be installed in a non-intrusive manner. A variety of embodiments of the transparent transceiver unit are provided herein. These embodiments are presented by way of example only and not by way of limitation.

Figure 1:
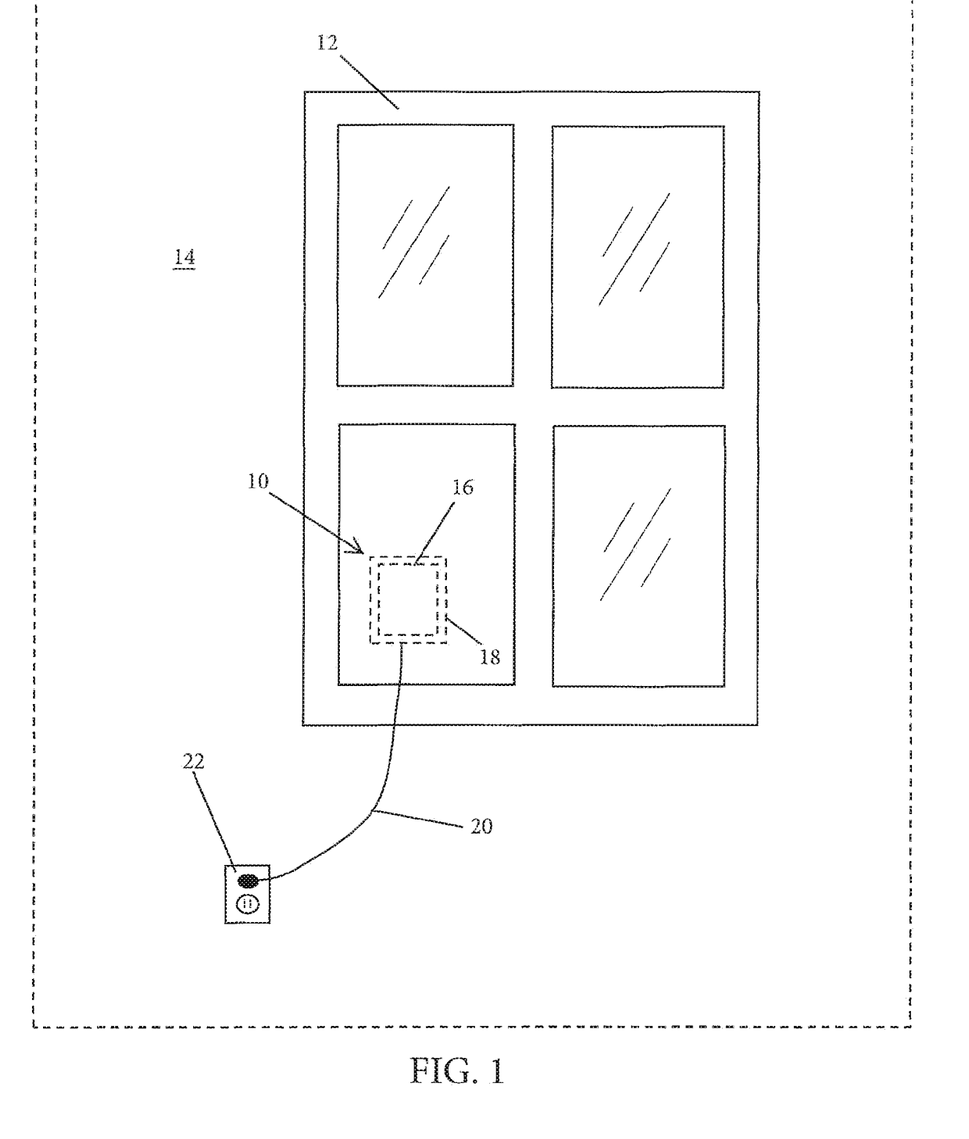
FIG. 1 depicts a transceiver unit mounted to a window, according to an exemplary embodiment.

FIG. 1 depicts an embodiment of a transparent transceiver unit 10. In the embodiment depicted, the transceiver unit 10 is mounted to a window 12 of a building 14; however, in other embodiments, the transceiver unit 10 could be mounted to another flat surface, such as a car window. The transceiver unit 10 includes an antenna unit 16 and a power unit 18. As will be discussed below, antenna unit 16 and the power unit 18 are mounted to opposite sides of the window 12, and both are constructed of materials that allow the transceiver unit 10 to be substantially transparent. However, no wires or components extend through the window 12 to physically connect the antenna unit 16 and the power unit 18. In embodiments, the antenna unit 16 is mounted on an exterior window surface, and the power unit 18 is mounted on an interior window surface. The antenna unit 16 and the power unit 18 can be mounted using, e.g., a silicone adhesive, an optically clear adhesive, transparent tape, an epoxy, a transparent glass or plastic frame, a vacuum silicone seal, etc. As depicted in FIG. 1, the power unit 18 has a wired connection 20 to a power source (depicted as an outlet 22; although, the power unit 18 could instead be hardwired into the electrical power distribution system of the building 14). In embodiments, the power unit 18 provides inductive power to the antenna unit 16, and thus, the power unit 18 and the antenna unit 16 are aligned on a horizontal axis perpendicular to the window 12. In other embodiments, the power unit 18 may be a microwave power transmitter that is remote from the widow 12, and in such embodiments, the power unit 18 wirelessly transmits power to a receiver on the antenna unit 16.

Figure 2:
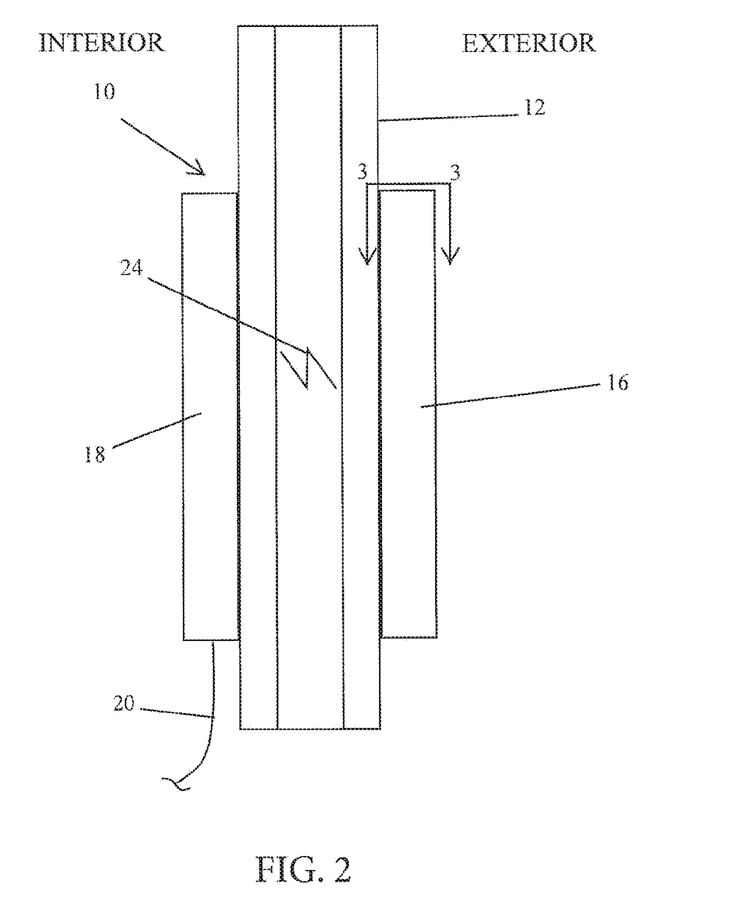
FIG. 2 depicts a side view of the transceiver unit of FIG. 1, according to an exemplary embodiment.

FIG. 2 depicts a side view of the window 12 having the transceiver unit 10 mounted thereon. As can be seen, the antenna unit 16 is mounted to an exterior surface of the window 12 (depicted as a double-pane window), and the power unit 18 is mounted to the interior surface of the window 12. Electrical power 24 is transmitted from the power unit 18 through the window 12 to the antenna unit 16. In this way, installation of the transceiver unit 10 does not require installation through surfaces of the building 14. Additionally, the relatively easy installation of the transceiver unit 10 means that a skilled worker is not needed to place the transceiver unit. That is, the transceiver unit 10 can be installed in the building 14 without having to damage the building 14. Further, by making the transceiver unit 10 substantially transparent, the transceiver unit 10 does not substantially obscure viewing through the window.

Figure 3:
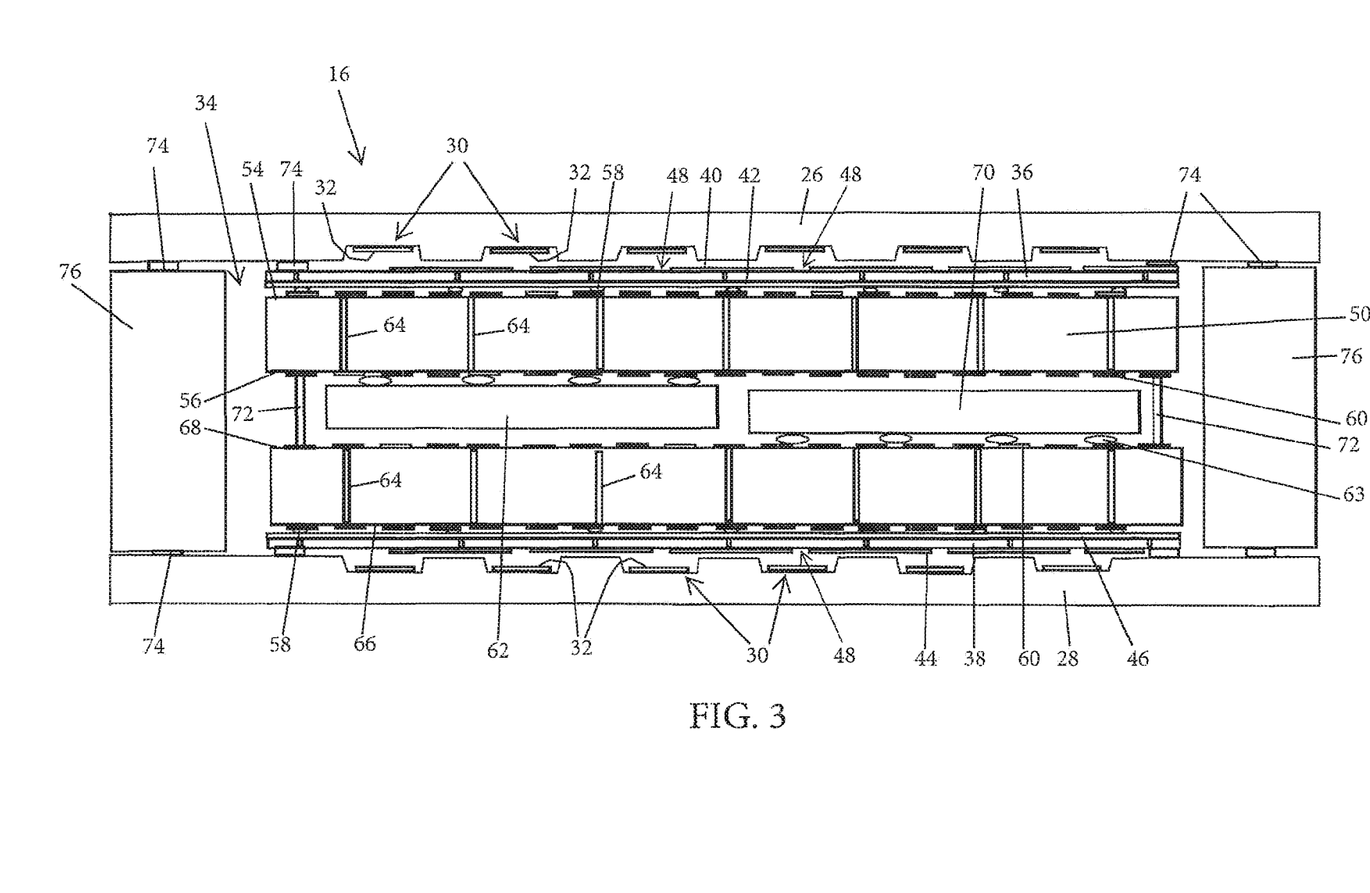
FIG. 3 depicts a cross-sectional view of the antenna unit of the transceiver unit, according to an exemplary embodiment.

FIG. 3 depicts a sectional view of the antenna unit 16. In the embodiment depicted, the antenna unit 16 includes a first antenna plate 26 and a second antenna plate 28. In embodiments, the first antenna plate 26 receives data at a first wavelength/frequency, and the second antenna plate 28 broadcasts the data at a second wavelength/frequency. For example, the first antenna plate 26 may be configured to receive 5G signals (e.g., millimeter waves at frequencies of 6 GHz and higher), and the second antenna plate 28 may be configured to broadcast the signal at Wi-Fi frequencies (e.g., 2.4 GHz or 5 GHz). In embodiments, the antenna unit 16 broadcasts the received signal at lower frequency that is better able to penetrate the window 12 or interior walls of the building 14. Similarly, the second antenna plate 28 may also receive signals at the second frequency (e.g., Wi-Fi frequency) that originate within the building 14, and the first antenna plate 26 may broadcast the signal at the first, higher frequency on the exterior of the building 14. In other embodiments, the first antenna plate 26 and the second antenna plate 28 may receive and transmit at the same wavelength/frequency. For example, the transceiver unit 10 may operate as a relay, e.g., in which antennas transmit/receive signals in different directions. In other embodiments, the antenna plates 26, 28 transmit/receive signals at a frequency of interest for the particular application, including frequencies in the range of 500 MHz to 100 GHz.

In order to broadcast and receive signals, the antenna plates 26, 28 have a plurality of depressions 30 with patch antennas 32 deposited therein. Further, the antenna plates 26, 28 define a cavity 34 therebetween in which the elements for transforming signals is provided. Disposed within the cavity 34 are a first waveguide element 36 and a second waveguide element 38. On one major surface, the first waveguide 36 has first coating 40, and on the opposite major surface, the first wave guide 36 has a second coating 42. Similarly, the second waveguide 38 has a first coating 44 on one major surface and a second coating 46 on the opposite major surface. The first coatings 40, 44 face the first antenna plate 26 and the second antenna plate 28, respectively. Each of the first coatings 40, 44 defines a plurality of slots 48 that align with a patch antenna 32 of a respective antenna plate 26, 28. The slots 48 allow for electromagnetic radiation to exit to or enter from the patch antennas 32. The second coatings 42, 46 are provided on the side of the waveguides elements 36, 38 facing away from their respective antenna plates 26, 28. The second coatings 42, 46 provide transitions from the underlying RF circuitry (discussed below) to their respective waveguide elements 36, 38.

Also disposed in the cavity 34 are a first printed circuit board (PCB) 50 and a second PCB 52. The first PCB 50 has a first side 54 and a second side 56. The first waveguide element 36 is connected to the first side 54 of the first PCB 50 with one or more soldered connections 58 between conductive traces 60 and the second coating 42. In embodiments, the soldered connections 58 between the first waveguide element 36 and the first PCB 50 are transparent. In other embodiments, no soldered connections 58 are provided, and the connection between the first waveguide element 36 and the first PCB 50 is made through direct contact (or only a small gap sufficiently close to permit the first waveguide element 36 to transfer energy. One or more first integrated circuits (IC) 62 are connected to traces 60 on the second side 56 of the first PCB 50 with soldered connections 58. The traces 60 on the first side 52 are connected to traces 60 on the second side 54 using a plurality of vias 64. In this way, signals generated in the first IC 62 are transmitted through the first PCB 50 to the first waveguide element 36 to the patch antennas 32 of the first antenna plate 26, or signals received at the patch antennas 32 are transmitted through the first waveguide element 36 to the first IC 62.

In a similar way, the second PCB 52 has a first side 66 and a second side 68. The second waveguide element 38 is connected to the first side 66 of the second PCB 52 with one or more soldered bumps 63 between conductive traces 60 and the fourth coating 46. Further, one or more second IC 70 are connected to traces 60 on the second side 68 of the second PCB 52. The traces 60 on the first side 66 are connected to the traces 60 on the second side 68 are connected using a plurality of vias 64. Thus, as with the first PCB 50, signals generated in the second IC 70 are transmitted through the second PCB 52 to the second waveguide element 38 to the patch antennas 32 of the second antenna plate 28, or signals received at the patch antennas are transmitted through the second waveguide element 38 to the second IC 70. In embodiments, the first IC 62 is configured to receive/transmit signals of a different frequency than the second IC 70. As mentioned above, the first IC 62 may be configured to receive/transmit signals according to the 5G standard (e.g., having frequency of 6 GHz or above), and the second IC 70 may be configured to receive/transmit signals according to the Wi-Fi standard (e.g., 2.4 GHz or 5 GHz).

As shown in FIG. 3, the first PCB 50 and the second PCB 52 are connected with interconnects 72. Thus, for example, the first PCB 50 can be configured to receive 5G signals from the exterior of a building and communicate those signals to the second PCB 52, which translates those signals to, e.g., Wi-Fi signals that are broadcast to the interior of the building. Further, the second PCB 52 may, for example, receive Wi-Fi signals from the interior of the building and communicate those signals to the first PCB 50, which translates those signals to, e.g., 5G signals that are broadcast on the exterior of the building.

In construction of the antenna unit 16, the waveguide elements 36 38 are bonded to their respective antenna plates 26, 28 using, e.g., adhesive seals or laser welds (shown as joints 74). Further, a glass frame 76 is provided between the antenna plates 26, 28 and defines a perimeter edge of the antenna unit 16. The glass frame 76 also is bonded to the antenna plates 26, 28 using, e.g., adhesive seals or laser welds (also shown as joints 74).

FIGS. 4-7 depict various layers and components of the antenna unit 16 in more detail. In particular, the first antenna plate 26, the first waveguide element 36, and the first and second coatings 40, 42 of the first waveguide element 36 are depicted in FIGS. 4-7. The corresponding second antenna plate 28, the second waveguide element 38, and the first and second coatings 44, 46 of the second waveguide element 38 are substantially similar to the depictions shown in FIGS. 4-7 as modified according to the particular requirements of the signal frequency. Thus, the discussion pertaining to FIGS. 4-7 applies as well to those layers and components.

Figure 4:
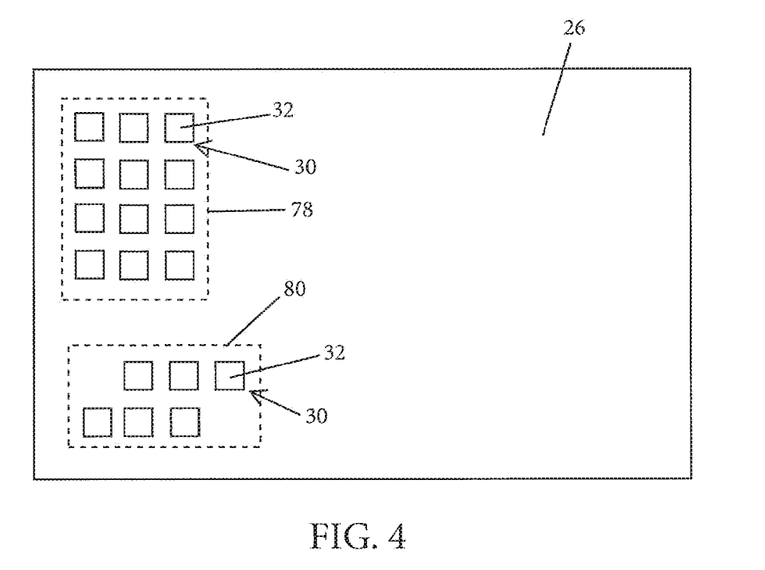
FIG. 4 depicts a plan view of an antenna plate, according to an exemplary embodiment.

Beginning with FIG. 4, the first antenna plate 26 is depicted. The antenna plate 26 includes depressions 30 with patch antennas 32. As can be seen in FIG. 4, the patch antennas 32 are arranged in a reception array 78 and a transmission array 80. In the embodiment depicted, the patch antennas 32 are 1 mm by 1 mm squares having a thickness of 300 nm or more. Such patch antennas 32 are useful for receiving and transmitting signals at 79 GHz. The size of the patch antennas 32 (length, width, and thickness) is dependent on the frequency of the signal that the patch antennas 32 are designed to send and receive. Additionally, the shape of the reception array 78 and the transmission array 80 will vary depending on the particular application for which the antenna unit 16 is deployed. In embodiments, the depressions 30 are deeper than the thickness of the patch antennas 32. In embodiments, the depressions 30 have a depth of 100 μm to 150 μm.

Figure 5:
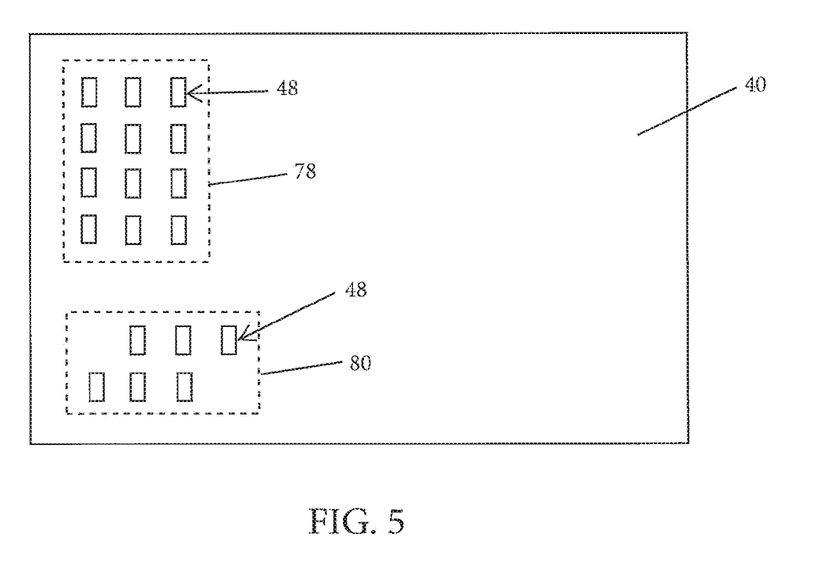
FIG. 5 depicts a plan view of a first coating of a waveguide element, according to an exemplary embodiment.

FIG. 5 depicts the first coating 40. As can be seen in FIG. 5, the first coating 40 includes a plurality of slots 48 aligned with the patch antennas 32. That is, the slots 48 are arranged in the same reception array 78 and transmission array 80 as the patch antennas 32. In embodiments, the slots 48 have the same length measurement as the patch antennas 32 but have a smaller width. In embodiments, the width is no more than half of the width of the patch antennas 32. In other embodiments, the width is no more than a quarter of the width of the patch antennas 32, and in still other embodiments, the width is about ½0th of the width of the patch antennas 32. As mentioned above, the slots 48 allow radiation to exit or enter the first waveguide element 36 to or from the patch antennas 32.

Figure 6:
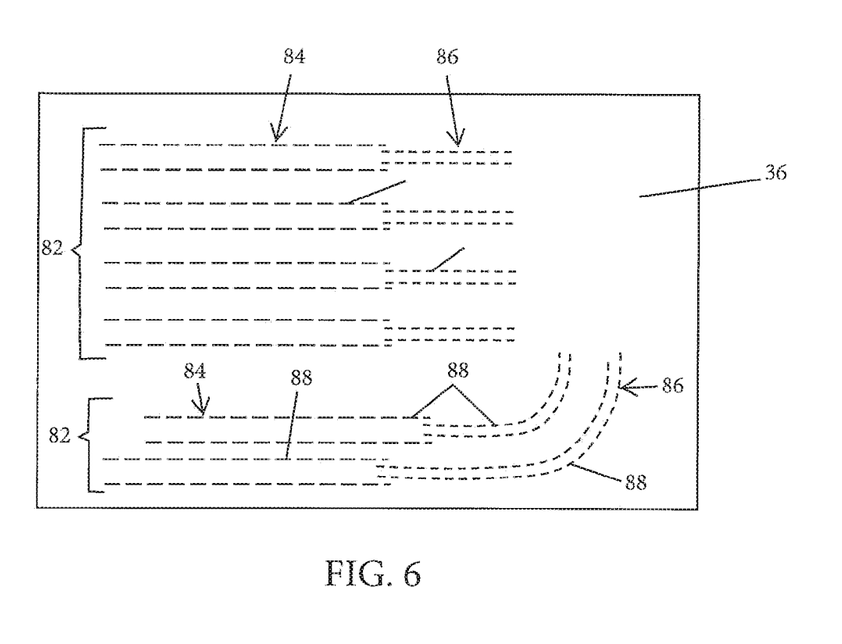
FIG. 6 depicts a plan view of a waveguide element, according to an exemplary embodiment.
Figure 7:
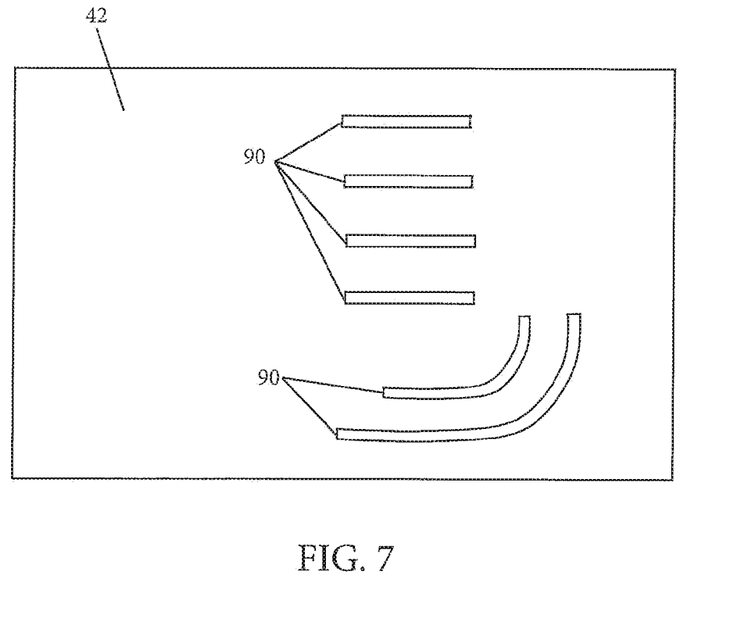
FIG. 7 depicts a plan view of a second coating of the waveguide element, according to an exemplary embodiment.

FIG. 6 depicts the first waveguide element 36. As can be seen, the first waveguide element 36 includes waveguide channels 82. The waveguide channels 82 have a first portion 84 and a second portion 86. The first portion 84 allows entry and exit of the radiation through the slots 48, and the second portion 86 transmits the radiation to or from the first IC 62. The channels 82 are composed of a plurality of vias 88 coated (or filled) with a conductive material. The vias 88 connect the first coating 40 of FIG. 5 with the second coating 42 of FIG. 7. As shown in FIG. 7, the second coating 42 includes radiation feed cutouts 90 that are aligned with the second portions 86 of the waveguide channels 82. The radiation feed cutouts 90 allow for radiation from first IC 62 to enter the waveguide channels 82 to be transmitted to the patch antennas 32 (or for radiation from the patch antennas 32 to be transmitted through the waveguide channels 82 to the first IC 62).

Figure 8:
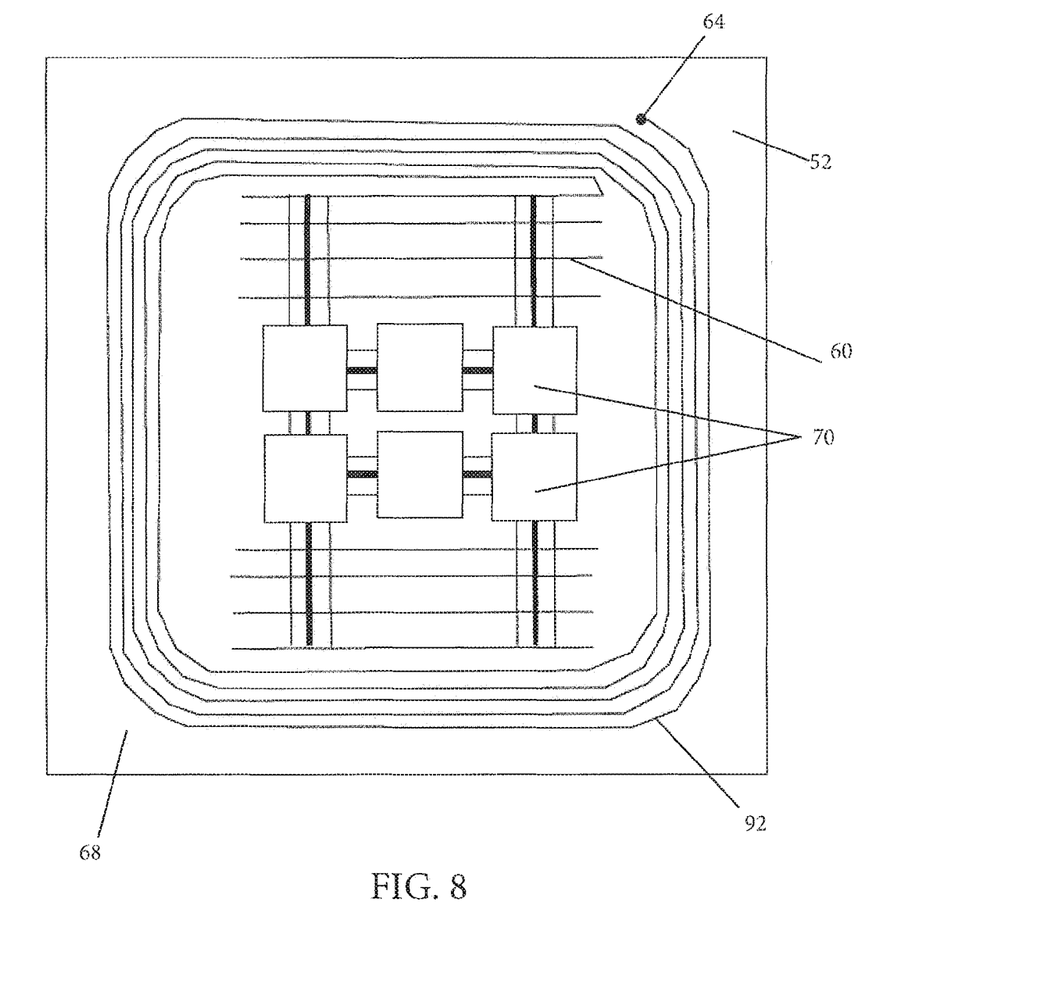
FIG. 8 depicts a plan view of a printed circuit board having an inductive charging element, according to an exemplary embodiment.

FIG. 8 depicts an embodiment of the second PCB 52. In general, the second PCB 52 depicted in FIG. 8 could be substantially similar to the second PCB 52, but the second PCB 52 in the embodiments depicted is closer to the surface of the window 12 (as shown, e.g., in FIG. 2). Thus, the second PCB 52 is more likely to carry inductive coils 92 for magnetic inductive charging from the power unit 18 (as shown, e.g., in FIG. 2). As shown in FIG. 8, the second side 68 of the second PCB 52 is depicted. Traces 60 provide electrical connections across the second side 68, including between the plurality of second IC 70. The inductive coil 92 is arranged around the periphery of the second PCB 52 and provide power to the second IC 70 through inductive coupling to the power unit 18. The outermost ring of the inductive coil 92 terminates in a via 64 that connects to another trace 60 on the other side 66 of the second PCB 52. The backside trace runs across the inductive coil 92 and terminates in a via 64 that goes back to the second side 68 of the second PCB 52. This arrangement takes the induced current to the power supply of the second PCB 52, is one of the second IC 70 on the second side 68.

Figure 9:
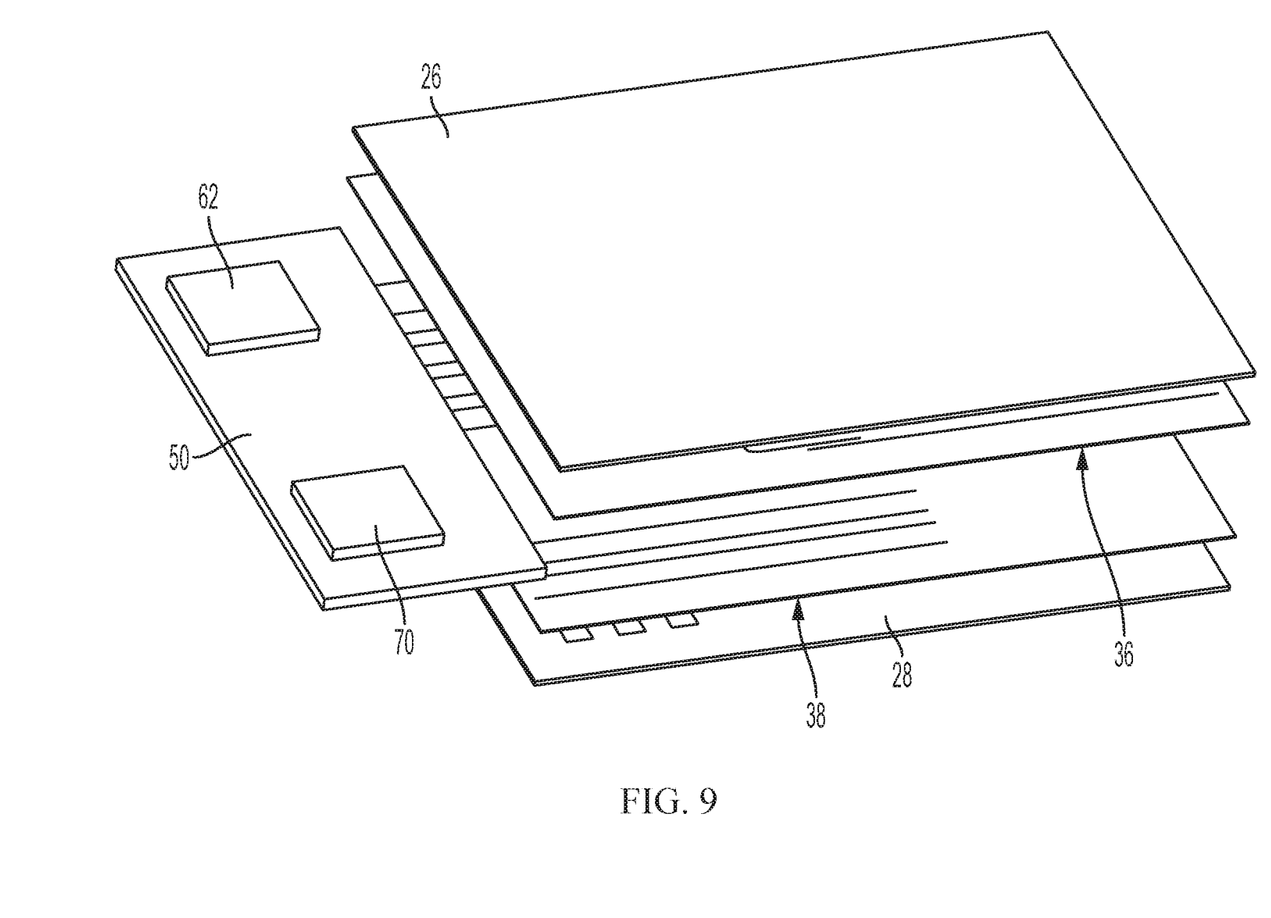
FIG. 9 depicts an exploded, perspective view of an antenna unit having two IC on a single PCB, according to an exemplary embodiment.

FIG. 9 depicts another embodiment of the antenna unit 16 in which the first IC 62 and the second IC 70 are mounted on the same PCB 50. As depicted, the two IC 62, 70 may both be mounted to the same side of the PCB 50, but in other embodiments, the first IC 62 may be mounted to a different side of the PCB 50 than the second IC 70. Notwithstanding, the PCB 50 and IC 62, 70 are still positioned between the waveguide elements 36, 38, which in turn are positioned between the antenna plates 26, 28. Providing both IC 62, 70 on the same PCB provides the advantage of a thinner overall package for the antenna unit 16.

Having described the general structure of the antenna unit 16, the materials for each component will be discussed (in relation to FIG. 3) relating to making the antenna unit 16 substantially transparent to visible light. As used herein, in embodiments, "substantially transparent" means that the antenna unit 16 transmits at least 50% of incident light in the visible spectrum, e.g., 400 nm to 700 nm (except through certain components, such as the IC 62, 70, that may not be made or are not currently available in transparent form). In other embodiments, "substantially transparent" means that the antenna unit 16 transmits at least 70% of incident light in the visible spectrum, and in still other embodiments, "substantially transparent" means that the antenna unit 16 transmits at least 80% of incident light in the visible spectrum. In embodiments, the antenna unit 16 may include other coatings or tints that provide, e.g., decorative, light shading, UV-blocking, or color matching functions.

The antenna plates 26, 28 are made from glass. In particular, the glass is selected to have a dielectric constant ($D_k$) of 5 or less, such as pure $SiO_2$. ($D_k$=3.85) In general, glasses having a low refractive index, e.g., having a refractive index of about 1.46 or lower, also tend to have a dielectric constant of 5 or less and are suitable for use as the antenna plates 26, 28. Additionally, glasses having constituents with low atomic numbers (e.g., ≤20) are also suitable for use as the antenna plates 26, 28. Advantageously, glass is also transparent to radiation in the mm-wavelength range. Exemplary glasses having the requisite dielectric constant include fused silica and lithium potassium borosilicate. In embodiments, the specific glass and the dielectric constant of that glass depend also on the material selected for the waveguide elements 36, 38. In particular, the glass used for the antenna plates 26, 28 has a dielectric constant of no more than half the dielectric constant of the material selected for the waveguide elements 36, 38. In embodiments, the patch antennas 32 are thin metallic coatings that remain transparent as a result of their thinness or the size of the metal particle deposited, or the patch antennas 32 may be transparent oxide conductors, such as indium-tin-oxide (ITO), aluminum-zinc-oxide (AZO), or indium-zinc-oxide (IZO). In other embodiments, the patch antennas are thin layers (e.g., 300 nm-500 nm) of carbon nanotubes, and in still other embodiments, the patch antennas are organic conductors, such as poly(3,4-ethylenedioxythiophene) ("PEDOT"). Metallic coatings may be applied through a variety of deposition techniques, such as photolithographic etching. In embodiments, the depressions 30 formed in the antenna plates 26, 28 are produced by etching, lost glass laminates, and/or repressing techniques.

The waveguide elements 36, 38 are made of a high dielectric constant glass materials, e.g., having a dielectric constant at least twice the dielectric constant of the glass material for the antenna plates 26, 28. In embodiments, the glass materials used for the waveguide elements 36, 38 is in the range of 5 to 15, more particularly in the range 8 to 10. In embodiments, glasses having constituents with a relatively high atomic number (e.g., >20) or having a very dense molecular structure are suitable materials for the waveguide elements 36, 38. Additionally, the material of the waveguide elements 26, 28 have a low dielectric loss tangent so that RF radiation is not absorbed, which may be achieved by limiting the use of alkali group ions. Lastly, the glass or ceramic must melt to a uniform consistency and be formable as thin sheet. In particular embodiments, the waveguide elements 36, 38 have a thickness of 100 μm to 200 μm. An exemplary glass usable for the waveguide elements 36, 38 is an alkaline earth boro-aluminosilicate glass, such as Willow® glass available from Corning Incorporated, Corning, NY Other exemplary glasses suitable for use as the waveguide elements 36, 38 include glasses with dielectric constants of 10.5 and 13.7, respectively. In other embodiments, the waveguide elements 36, 38 are made from aluminum oxide having a thickness of 40 μm to 100 μm. Advantageously, aluminum oxide is transparent from about 20 μm to 80 μm, and at 100 μm, the transparency is still about 80%. In embodiments, the first coatings 40, 44 and second coatings 42, 46 on the waveguide elements 36, 38 are made from a transparent conductive oxide, such as ITO, AZO, or IZO.

In embodiments, the PCB 50, 52 are made from glass. In particular, the glass may be selected to have a coefficient of thermal expansion that is within 30% of the coefficient of thermal expansion of the material used for the waveguide elements 36, 38, more particularly within 20%, or even within 10%. In embodiments, the material selected for the PCB 50, 52 are alkali aluminosilicates, such as Gorilla® glass, all available from Corning Incorporated, Corning, NY The traces 60 and vias 64 are made from a transparent conductive oxide, such as ITO, AZO, or IZO.

The glass frame 76 is also made from a glass material, particularly from the same glass material used to make the antenna plates 26, 28. Various methods are possible for sealing the antenna plates 26, 28 to the glass frame 76. In embodiments, a bonding agent, such as a UV-curing epoxy can be used, or in embodiments, the antenna plates 26, 28 are joined by laser welding. In embodiments, the specific method of joining is selected to provide a transparent joint that is also airtight, watertight, and able with withstand ambient weather conditions (e.g., temperature ranges from −40° C. to 60° C. and humidity from 0 to 100% R.H.).

The power unit 18 shown in FIGS. 1 and 2 would be constructed of substantially the same materials as the antenna unit 16. In embodiments, the power unit 18 includes two cover sheets (e.g., a top and bottom sheet). In embodiments, the cover sheets are glass or plastic (e.g., polycarbonate). In embodiments, an inductive coil (such as the inductive coil 92 of FIG. 8) is positioned between the cover sheets. Further, in embodiments, a controller circuit (such as IC 70 as shown in FIG. 8) is also positioned between the cover sheets and could be positioned within the inductive coil as well. In embodiments, a plan view of the power unit 18 would look substantially similar to the depiction in FIG. 8 with the additional feature of AC/DC power wires connected to the control circuit to provide power to transmit via the inductive coils to the antenna unit 16.

Aspect (1) of this disclosure pertains to an antenna unit, comprising: a first antenna plate having a first interior surface and a first exterior surface; a second antenna plate having a second interior surface and a second exterior surface, the second antenna plate being spatially disposed from the first antenna plate and the second interior surface of the second antenna plate facing the first interior surface of the first antenna plate; a glass frame disposed between the first interior surface of the first antenna plate and the second interior surface of the second antenna plate, the glass frame defining an internal cavity; at least one printed circuit board (PCB); a first integrated circuit (IC) mounted to the at least one PCB, the first IC configured to at least one of send or receive signals at a first frequency; a second IC mounted to the at least one PCB, the second IC configured to at least one of send or receive signals at a second frequency, the second frequency being different from the first frequency; a first waveguide element configured to transmit signals at the first frequency through first waveguide channels between the first antenna plate and the first IC; and a second waveguide element configured to transmit signals at the second frequency through second waveguide channels between the second antenna plate and the second IC; wherein the first antenna plate, the second antenna plate, the glass frame, and each of the at least one PCB comprises a material that transmits at least 50% of incident light in the visible spectrum.

Aspect (2) of this disclosure pertains to the antenna unit of Aspect (1), wherein each of the first antenna plate and the second antenna plate comprises a plurality of antenna patches, each of the plurality of antenna patches being disposed in a depression formed in the respective first or second interior surface of the respective first or second antenna plate.

Aspect (3) of this disclosure pertains to the antenna unit of Aspect (2), wherein each of the first waveguide element and the second waveguide element comprises a first coating facing the antenna patches and a second coating facing the at least one printed circuit board; wherein the first coating contains a plurality of slots, each slot being aligned with one of the plurality of antenna patches; and wherein the second coating contains a radiation feed cutout configured to transmit signals from or to the respective first or second waveguide channels.

Aspect (4) of this disclosure pertains to the antenna unit of Aspect (3), wherein the first coating and the second coating comprise a transparent conductive oxide.

Aspect (5) of this disclosure pertains to the antenna unit of Aspect (4), wherein the transparent conductive oxide is at least one of indium-tin-oxide, aluminum-zinc-oxide, or indium-zinc-oxide.

Aspect (6) of this disclosure pertains to the antenna unit of any one of Aspects (1) through (5), wherein the material of the first antenna plate and the second antenna plate is a glass having a dielectric constant of 5 or less.

Aspect (7) of this disclosure pertains to the antenna unit of any one of Aspects (1) through (6), wherein the first waveguide element and the second waveguide element comprise a material that transmits at least 50% of incident light in the visible spectrum.

Aspect (8) of this disclosure pertains to the antenna unit of Aspect (7), wherein the material of the first waveguide element and the second waveguide element is an alkaline earth boro-aluminosilicate glass.

Aspect (9) of this disclosure pertains to the antenna unit of Aspect (8), wherein a thickness of each of the first waveguide element and the second waveguide element together is less than 200 μm.

Aspect (10) of this disclosure pertains to the antenna unit of Aspect (8), wherein a thickness of each of the first waveguide element and the second waveguide element is from 100 μm to 200 μm.

Aspect (11) of this disclosure pertains to the antenna unit of any one of Aspects (1) through (10), wherein the first frequency is at least 6 GHz.

Aspect (12) of this disclosure pertains to the antenna unit of any one of Aspects (1) through (11), wherein the first frequency is from 20 GHz to 80 GHz.

Aspect (13) of this disclosure pertains to the antenna unit of any one of Aspects (1) through (12), wherein the second frequency is one of 2.4 GHz or 5 GHz.

Aspect (14) of this disclosure pertains to the antenna unit of any one of Aspects (1) through (13), wherein the at least one PCB comprises a first PCB and a second PCB, wherein the first IC is mounted to the first PCB, and wherein the second IC is mounted to the second PCB.

Aspect (15) of this disclosure pertains to the antenna unit of Aspect (14), wherein the first PCB is parallel to and spatially disposed from the second PCB and wherein at least one interconnect provides electrical communication between the first PCB and the second PCB.

Aspect (16) of this disclosure pertains to the antenna unit of any one of Aspects (1) through (15), wherein the glass frame is joined to the first antenna plate and to the second antenna plate in a manner that prevents water and air from reaching the internal cavity.

Aspect (17) of this disclosure pertains to a method, comprising the steps of: mounting an antenna unit to an exterior surface of a window, the antenna unit comprising at least one transparent antenna plate, at least one transparent waveguide element, at least one transparent printed circuit board (PCB), and at least one integrated circuit (IC), wherein the at least one IC is mounted to the at least one PCB and wherein the at least one transparent waveguide element transmits signals between the at least one antenna plate and the at least one IC; providing a power unit on an interior side of the window; and wirelessly transmitting electrical power through the window to the antenna unit.

Aspect (18) of this disclosure pertains to the method of Aspect (17), wherein the step of providing further comprises mounting the power unit to an interior surface of the window.

Aspect (19) of this disclosure pertains to the method of Aspect (18), wherein the step of wirelessly transmitting electrical power further comprises inductively powering the antenna unit.

Aspect (20) of this disclosure pertains to the method of Aspect (17), wherein the step of wirelessly transmitting electrical power further comprises directing RF-power at a receiver of the antenna unit.

Aspect (21) of this disclosure pertains to the method of any one of Aspects (17) through (20), further comprising the steps of receiving a signal having a first frequency at the antenna unit and transmitting a signal from the antenna unit through the window at a second frequency, the second frequency being lower than the first frequency.

Aspect (22) of this disclosure pertains to the method of Aspect (21), wherein the first frequency is at least 6 GHz.

Aspect (23) of this disclosure pertains to the method of Aspect (21) or Aspect (22), wherein the first frequency is from 20 GHz to 80 GHz.

Aspect (24) of this disclosure pertains to the method of any one of Aspects (21) through (23), wherein the second frequency is one of 2.4 GHz or 5 GHz.

Aspect (25) of this disclosure pertains to a transceiver unit, comprising: a power unit configured to wirelessly transmit power through a window; and an antenna unit configured to receive power through the window from the power unit, the antenna unit comprising: at least one antenna plate; at least one printed circuit board (PCB); at least one integrated circuit (IC) mounted to the at least one PCB; and at least one waveguide element configured to transmit signals between the at least one antenna plate and the at least one IC; and wherein each of the at least one antenna plate, the at least one waveguide element, and the at least one PCB comprises a material that transmits at least 50% of incident light in the visible spectrum.

Aspect (26) of this disclosure pertains to the transceiver unit of Aspect (25), wherein the at least one antenna plate comprises a first antenna plate having a first interior surface and a first exterior surface and a second antenna plate having a second interior surface and a second exterior surface; wherein the second antenna plate is spatially disposed from the first antenna plate and the second interior surface of the second antenna plate faces the first interior surface of the first antenna plate; and wherein the transceiver unit further comprises a glass frame disposed between the first interior surface of the first antenna plate and the second interior surface of the second antenna plate, the glass frame defining an internal cavity in which the at least one PCB, the at least one IC, and the at least one waveguide element are contained.

Aspect (27) of this disclosure pertains to the transceiver unit of Aspect (26), wherein the glass frame is joined to the first antenna plate and to the second antenna plate in a manner that prevents water and air from reaching the internal cavity.

Aspect (28) of this disclosure pertains to the transceiver unit of any one of Aspects (25) through (27), wherein each of the at least one antenna plate comprises a plurality of antenna patches, each of the plurality of antenna patches being disposed in a depression formed in the at least one antenna plate.

Aspect (29) of this disclosure pertains to the transceiver unit of any one of Aspects (25) through (28), wherein the material of each of the at least one waveguide element is an alkaline earth boro-aluminosilicate glass.

Aspect (30) of this disclosure pertains to the transceiver unit of Aspect (29), wherein a thickness of each of the at least one waveguide element is from 100 µm to 200 µm.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An antenna unit, comprising:
a first antenna plate having a first interior surface and a first exterior surface;
a second antenna plate having a second interior surface and a second exterior surface, the second antenna plate being spatially disposed from the first antenna plate and the second interior surface of the second antenna plate facing the first interior surface of the first antenna plate;
a glass frame disposed between the first interior surface of the first antenna plate and the second interior surface of the second antenna plate, the glass frame defining an internal cavity;
at least one printed circuit board (PCB);
a first integrated circuit (IC) mounted to the at least one PCB, the first IC configured to at least one of send or receive signals at a first frequency;
a second IC mounted to the at least one PCB, the second IC configured to at least one of send or receive signals at a second frequency, the second frequency being different from the first frequency;
a first waveguide element configured to transmit signals at the first frequency through first waveguide channels between the first antenna plate and the first IC, and
a second waveguide element configured to transmit signals at the second frequency through second waveguide channels between the second antenna plate and the second IC;
wherein the first antenna plate, the second antenna plate, the glass frame, and each of the at least one PCB comprises a material that transmits at least 50% of incident light in the visible spectrum.

2. The antenna unit of claim 1, wherein each of the first antenna plate and the second antenna plate comprises a plurality of antenna patches, each of the plurality of antenna patches being disposed in a depression formed in the respective first or second interior surface of the respective first or second antenna plate.

3. The antenna unit of claim 2, wherein each of the first waveguide element and the second waveguide element comprises a first coating facing the antenna patches and a second coating facing the at least one printed circuit board;
wherein the first coating contains a plurality of slots, each slot being aligned with one of the plurality of antenna patches; and
wherein the second coating contains a radiation feed cutout configured to transmit signals from or to the respective first or second waveguide channels.

4. The antenna unit of claim 3, wherein the first coating and the second coating comprise a transparent conductive oxide.

5. The antenna unit of claim 4, wherein the transparent conductive oxide is at least one of indium-tin-oxide, aluminum-zinc-oxide, or indium-zinc-oxide.

6. The antenna unit of claim 1, wherein the material of the first antenna plate and the second antenna plate is a glass having a dielectric constant of 5 or less.

7. The antenna unit of claim 1, wherein the first waveguide element and the second waveguide element comprise a material that transmits at least 50% of incident light in the visible spectrum.

8. The antenna unit of claim 7, wherein the material of the first waveguide element and the second waveguide element is an alkaline earth boro-aluminosilicate glass.

9. The antenna unit of claim 8, wherein a thickness of each of the first waveguide element and the second waveguide element together is less than 200 µm.

10. The antenna unit of claim 8, wherein a thickness of each of the first waveguide element and the second waveguide element is from 100 µm to 200 µm.

11. The antenna unit of claim 1, wherein the first frequency is at least 6 GHz.

12. The antenna unit of claim 1, wherein the first frequency is from 20 GHz to 80 GHz.

13. The antenna unit of claim 1, wherein the second frequency is one of 2.4 GHz or 5 GHz.

14. The antenna unit of claim 1, wherein the at least one PCB comprises a first PCB and a second PCB, wherein the first IC is mounted to the first PCB, and wherein the second IC is mounted to the second PCB.

15. The antenna unit of claim 14, wherein the first PCB is parallel to and spatially disposed from the second PCB and wherein at least one interconnect provides electrical communication between the first PCB and the second PCB.

16. The antenna unit of claim 1, wherein the glass frame is joined to the first antenna plate and to the second antenna plate in a manner that prevents water and air from reaching the internal cavity.

17. A method, comprising the steps of:
- mounting an antenna unit to an exterior surface of a window, the antenna unit comprising at least one transparent antenna plate, at least one transparent waveguide element, at least one transparent printed circuit board (PCB), and at least one integrated circuit (IC), wherein the at least one IC is mounted to the at least one PCB and wherein the at least one transparent waveguide element transmits signals between the at least one antenna plate and the at least one IC; and
- wirelessly transmitting electrical power from a power unit on an interior side of the window through the window to the antenna unit.

18. The method of claim 17, further comprising the steps of receiving a signal having a first frequency at the antenna unit and transmitting a signal from the antenna unit through the window at a second frequency, the second frequency being lower than the first frequency.

19. A transceiver unit, comprising:
- a power unit configured to wirelessly transmit power through a window; and
- an antenna unit configured to receive power through the window from the power unit, the antenna unit comprising:
  - at least one antenna plate;
  - at least one printed circuit board (PCB);
  - at least one integrated circuit (IC) mounted to the at least one PCB; and
  - at least one waveguide element configured to transmit signals between the at least one antenna plate and the at least one IC; and
  - wherein each of the at least one antenna plate, the at least one waveguide element, and the at least one PCB comprises a material that transmits at least 50% of incident light in the visible spectrum.

20. The transceiver unit of claim 19, wherein the at least one antenna plate comprises a first antenna plate having a first interior surface and a first exterior surface and a second antenna plate having a second interior surface and a second exterior surface;
- wherein the second antenna plate is spatially disposed from the first antenna plate and the second interior surface of the second antenna plate faces the first interior surface of the first antenna plate; and
- wherein the transceiver unit further comprises a glass frame disposed between the first interior surface of the first antenna plate and the second interior surface of the second antenna plate, the glass frame defining an internal cavity in which the at least one PCB, the at least one IC, and the at least one waveguide element are contained.

* * * * *

UNITED STATES PATENT AND TRADEMARK OFFICE
CERTIFICATE OF CORRECTION

| | |
|---|---|
| PATENT NO. | : 11,881,613 B2 |
| APPLICATION NO. | : 17/609185 |
| DATED | : January 23, 2024 |
| INVENTOR(S) | : Mikael Bror Taveniku et al. |

It is certified that error appears in the above-identified patent and that said Letters Patent is hereby corrected as shown below:

In the Specification

In Column 1, Line 9, after "which" insert -- claims --.

In the Claims

In Column 12, Line 7, in Claim 1, delete "IC," and insert -- IC; --.

Signed and Sealed this
Twenty-fifth Day of June, 2024

Katherine Kelly Vidal
*Director of the United States Patent and Trademark Office*